(12) United States Patent  (10) Patent No.: US 7,934,838 B2
Chen et al.  (45) Date of Patent: May 3, 2011

(54) PROJECTOR AND HEAT INSULATING DEVICE THEREOF

(75) Inventors: Hua-Shing Chen, Hsin-Chu (TW); Chin-Tsao Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 364 days.

(21) Appl. No.: 12/142,767

(22) Filed: Jun. 19, 2008

(65) Prior Publication Data

US 2009/0066918 A1 Mar. 12, 2009

(30) Foreign Application Priority Data

Sep. 12, 2007 (TW) ................................ 96133993 A

(51) Int. Cl.
*G03B 21/16* (2006.01)
(52) U.S. Cl. ............... 353/56; 353/57; 353/60; 353/119
(58) Field of Classification Search .................... 353/56, 353/57, 60, 119
See application file for complete search history.

(56) References Cited

U.S. PATENT DOCUMENTS 6,428,170 B1 * 8/2002 Haba ................................ 353/56

* cited by examiner

*Primary Examiner* — Seung C Sohn
(74) *Attorney, Agent, or Firm* — Chun-Ming Shih

(57) ABSTRACT

A projector includes a case, a separating plate, an electronic component system, a light source device and a blocking device. The case has a space defined therein. The separating plate is arranged in the case to divide the space into a first space and a second space. The electronic component system is arranged in the first space. The light source device for emitting light is arranged in the second space. The blocking device has a blocking plate which is arranged adjacent to the separating plate and controlled to be located from a first position and a second position. When the blocking plate is located at the first position, air flows from the first space into the second space. When the blocking plate is located at the second position, air in the second space is prevented from entering into the first space.

17 Claims, 5 Drawing Sheets

PROJECTOR AND HEAT INSULATING DEVICE THEREOF

FIELD OF THE INVENTION

The present invention relates to projectors, and more specifically, to a projector which effectively prevents heat generated from a light source device of the projector from conversely entering to an electronic component system when the power is cut off.

DESCRIPTION OF THE RELATED ART

Projectors usually employ high power bulbs as light source devices. Heat generated from the light source devices are dissipated by air blast devices.

Referring to FIG. 1, a conventional projector 10 includes a case 11, an optical engine 12, an electronic component system 120, a light source device 13, a separating plate 14 and an air blast device 15. The electronic component system 120 is usually a main board or a printed circuit board. The air blast device 15 is usually a fan. The optical engine 12 includes an optical integration rod 122, a lens module 124, a light valve 126 and a projection lens 128.

The separating plate 14 is arranged in the case 11 to divide a space defined by the case 11 into a first space 18 and a second space 19. The first space is configured for containing the optical engine 12 and the electronic component system 120. The second space is configured for containing the light source device 13. The air blast device 15 is disposed on the separating plate 14. A portion of the separating plate 14, which is normally a transmission portion 17, is arranged between the light source device 13 and the optical engine 12.

When the projector 10 is operating, the light source device 13 emits light. The light passes through the transmission portion 17 into the first space 18, and then an image is formed on a remote screen (not shown) by the projection lens 128 after the light passes through the optical integration rod 122, the lens module 124 and the light valve 126. Simultaneously, heat generated from the light source device 13 is dissipated by airflow generated from the air blast device 15. Concretely, the air blast device 15 makes air pass through the light source device 13 and flow out of a vent 16 formed on the case 11 to dissipate the heat generated from the light source device 13.

However, conventionally the power of the projector 10 is not cut off during a time after the projector 10 is shut down. That is because the light source device 13 generates much heat when operating, and the air blast device 15 needs to work for a while to lower the temperature of the light source device 13. Otherwise, the heat generated from the light source device 13 will conversely enter into the first space containing the optical engine 12 and the electronic component system 120. Therefore, if the power is accidentally cut off when the projector is operating, the electronic components of the optical engine 12 and the electronic component system 120 may be damaged or even destroyed.

What is needed is a projector, which effectively prevents the heat generated by the light source device of the projector conversely from entering into the space containing the optical engine and the electronic component system.

BRIEF SUMMARY

A projector in accordance with a preferred embodiment of the present invention includes a case, a separating plate, an electronic component system, a light source device and a blocking device. The case has a space defined therein. The separating plate is arranged in the case to divide the space defined by the case into a first space and a second space. The electronic component system is arranged in the first space. The light source device is arranged in the second space to be configured for emitting light. The blocking device has a blocking plate, and the blocking plate is arranged adjacent to the separating plate and controlled by the blocking device to be located from a first position and a second position. When the blocking plate is located at the first position, air flows from the first space into the second space. When the blocking plate is located at the second position, air in the second space is prevented from entering into the first space.

The present projector employs the blocking device being arranged between the light source device and the air blast device, and the blocking device has the blocking plate which is capable of converting its position. The blocking plate is located at the second position while the power of the projector is switched off (including the projector being normally shut down and the power being normally or suddenly cut off). Therefore, the blocking plate prevents the air in the second space containing the light source device from entering into the first space containing the electronic component system when the projector is switched off, such that the power of the projector may be cut off after the projector is shut down. The present projector is used conveniently, and the heat generated from the light source device will not influence the electronic component system. Furthermore, even if the power of the operating projector is suddenly cut off, the heat generated from the light source device is prevented from conversely entering into the first space containing the electronic component system. Therefore, the projector will be not destroyed when the power is suddenly cut off.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
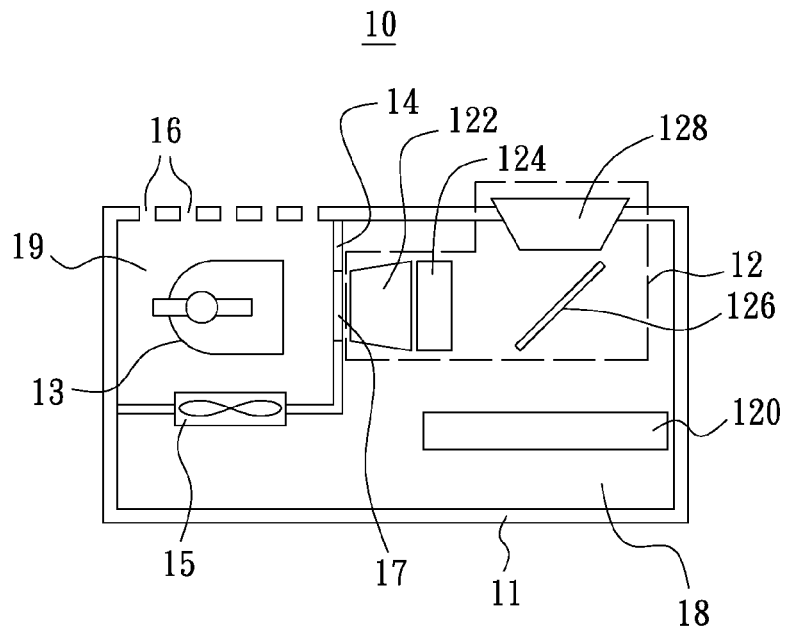
FIG. 1 is a schematic, top crossed-sectional view of a conventional projector.
Figure 2:
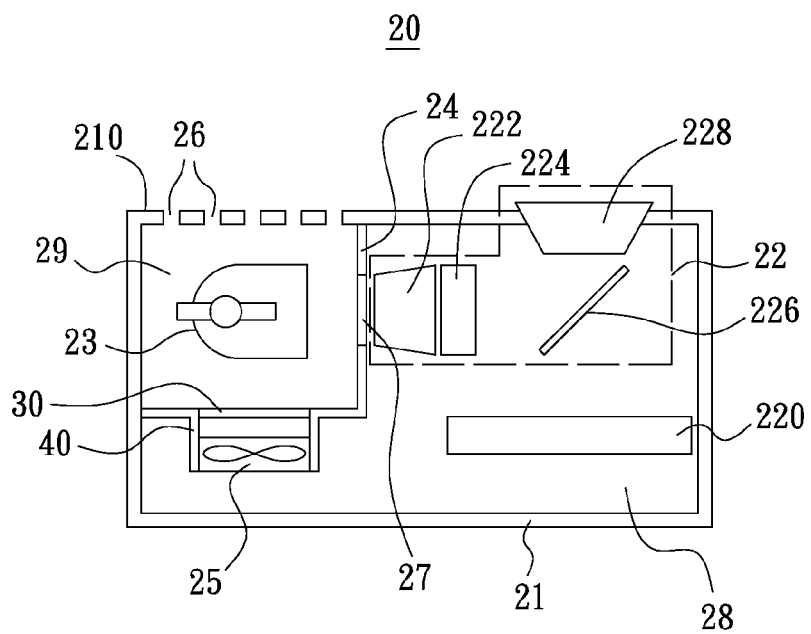
FIG. 2 is a schematic, top crossed-sectional view of a projector of a first preferred embodiment of the present invention.

Referring to FIG. 2, a projector 20 in accordance with a first preferred embodiment of the present invention is provided. The projector 20 includes a case 21, an optical engine 22, a light source device 23, a separating plate 24, an electronic component system 220, an air blast device 25 and a blocking device 30. Usually, the electronic component system 220 includes a main board or a printed circuit board. The air blast device 25 includes a fan. The light source device 23 includes a bulb. The optical engine 22 includes an optical integration rod 222, a lens module 224, a light valve 226 and a projection lens 228.

The case 21 defines a space therein. The separating plate 24 is arranged in the case 21 to divide the space defined by the case 21 into a first space 28 and a second space 29. The electronic component system 220 and the optical engine 22 are contained in the first space 28. The light source device 23 is contained in the second space 29 to provide light for the projector 20. The separating plate 24 includes a transmission portion 27 arranged between the light source device 23 and the optical engine 22. The light emitted from the light source device 23 transmits to the optical engine 22 through the transmission portion 27. The case 21 includes a side surface 210 and at least one first vent 26 formed on the side surface 210. The at least one first vent 26 is arranged on the case 21 corresponding to the second space 29 and communicates with the first space 28. The air blast device 25 is arranged in the first space 28 and fixed on the separating plate 24 through a frame 40 to generate airflow for dissipating the heat generated by the light source device 23 out of the projector 20 through the at least one first vent 26.

Figure 3:
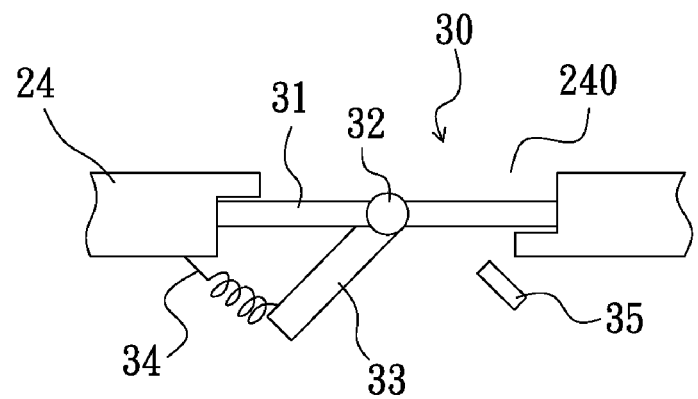
FIG. 3 is a schematic, crossed-sectional view of a blocking device of the projector in FIG. 2, wherein a blocking plate of the blocking device closes a second vent.

The blocking device 30 includes a blocking plate 31. Referring to FIG. 3, the blocking plate 31 is arranged on the separating plate 24. In this exemplary embodiment, the blocking plate 31 is arranged between the light source device 23 and the air blast device 25. The blocking plate 31 is controlled by the blocking device 30 to be located from a first position and a second position. When the blocking plate 31 is located at the first position, the airflow generated from the air blast device 25 is flowed from the first space 28 to the second space 29. When the blocking plate 31 is located at the second position, the air in the second space 29 is prevented from entering into the first space 28.

Figure 4:
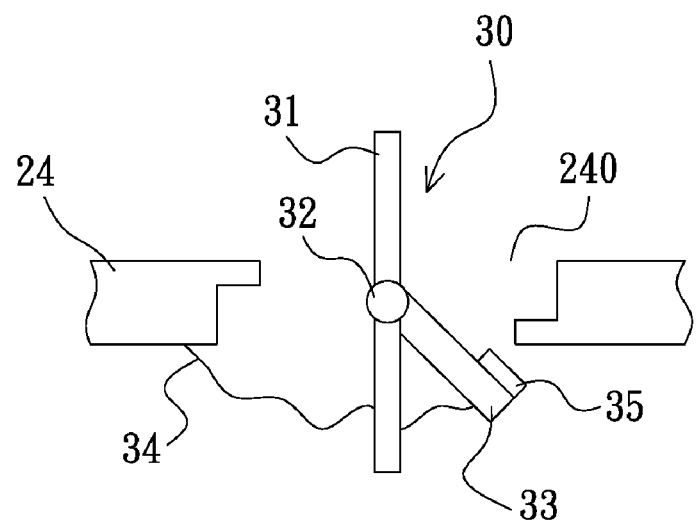
FIG. 4 is a schematic, crossed-sectional view of the blocking device in FIG. 3, wherein the blocking plate of the blocking device opens the second vent.

Referring to FIGS. 3 and 4, the separating plate 24 includes a second vent 240. The blocking device 30 further includes an electromagnet 35, an elastic element 34 and a press rod 33. The blocking plate 31 is arranged in the second vent 240 and rotatable with an axis 32 parallel to a plane defined by the second vent 240. The electromagnet 35 is arranged in the projector 30 (e.g., fixed on the bottom of the case 21). The elastic element 34 may be a spring, which has one terminal end fixed in the projector (e.g., fixed on the bottom of the case or on the separating plate 24), and another terminal end connected with the press rod 33. The press rod 33 is fixed on the axis 32 and has a metal or magnet (not shown) magnetized by the magnetic force. When the projector 20 is provided with power, the electromagnet 35 is designed to be provided with power synchronously for magnetizing the press rod 33 such that the blocking plate 31 is rotated to the first position as shown in FIG. 4. When the projector 20 is switched off (including the projector being normally shut down and the power being normally or suddenly cut off), the electromagnet 35 stops magnetizing the press rod 33 such that the press rod 33 is pulled by the elastic element 34 and the blocking plate 31 is rotated to the second position as shown in FIG. 3.

Since the present projector 20 employs the blocking device 30 arranged between the light source device 23 and the blast device 25 to rotate the blocking plate 31, the blocking plate 31 prevents the airflow in the second space 29 containing the light source device 23 from entering into the first space 28 containing the electronic component system 220 when the projector 20 is switched off. Thus the power of the projector 20 may be cut off after the projector 20 is shut down. Therefore, the present projector 20 is used conveniently, and the heat generated by the light source device 23 cannot affect the electronic component system 220 and the optical engine 22. Furthermore, even if the power of the operating projector 20 is suddenly cut off, the heat generated by the light source device 23 is prevented from conversely entering into the first space 28 containing the electronic component system 220 and the optical engine 22. Therefore, the projector 20 will be not damaged or destroyed.

Of course, the present blocking device 30 of the projector 20 may be designed alternatively as following.

Figure 5:
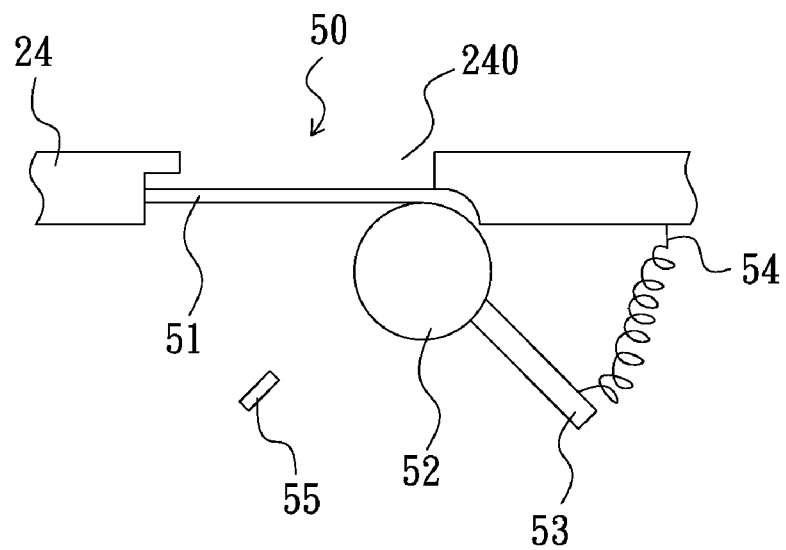
FIG. 5 is a schematic, crossed-sectional view of a blocking device of the projector in accordance with a second preferred embodiment of the present invention, wherein a blocking plate of the blocking device closes a second vent.
Figure 6:
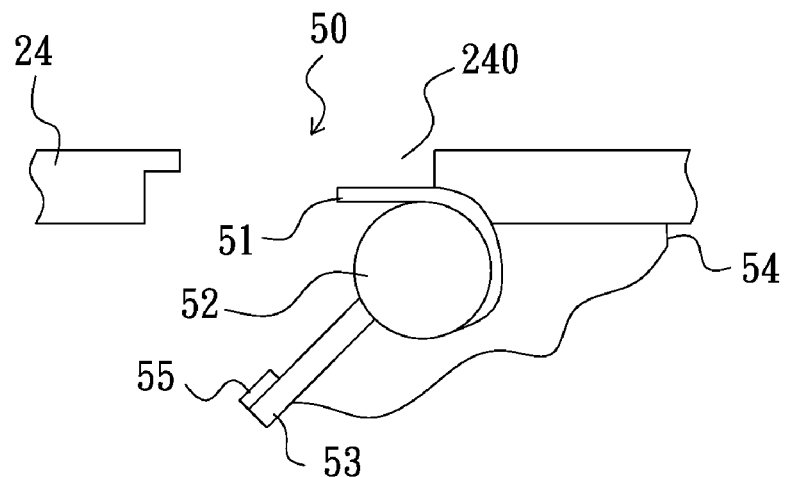
FIG. 6 is a schematic, crossed-sectional view of the blocking device in FIG. 5, wherein the blocking plate of the blocking device opens the second vent.

Referring to FIGS. 5 and 6, a blocking device 50 of the projector 20 in accordance with a second preferred embodiment is provided. The present blocking device 50 includes a blocking plate 51, an axis 52, an electromagnet 55, an elastic element 54 and a press rod 53. The electromagnet 55 and the elastic element 54 are fixed in the projector 20 same to the electromagnet 35 and the elastic element 34 of the first preferred embodiment. The press rod 53 is fixed on the axis 52 and has a metal or magnet (not shown) magnetized by the magnetic force. When the projector 20 is provided with power, the electromagnet 55 magnetizes the press rod 53 such that the blocking plate 31 wraps around the axis 52 to be located at a first position as shown in FIG. 6. When the power of the projector 20 is cut off, the electromagnet 55 stops magnetizing the press rod 53 such that the press rod 53 is pulled by the elastic element 54 and the blocking plate 51 gets back from the axis 52 to be located at a second position as shown in FIG. 5.

Figure 7:
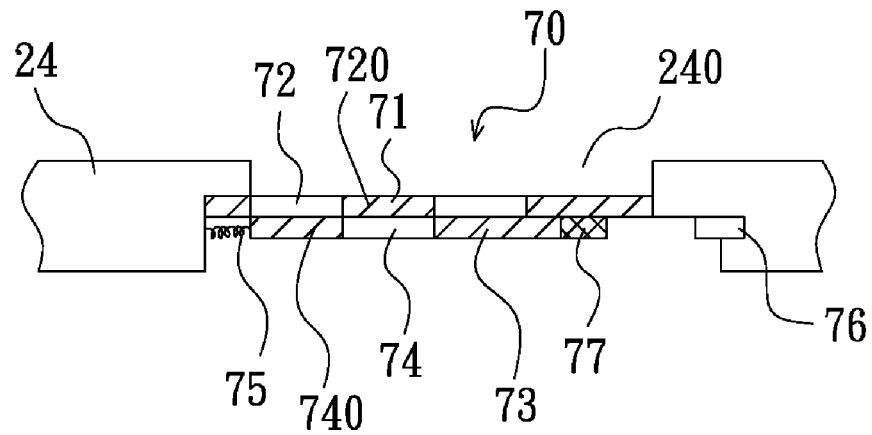
FIG. 7 is a schematic, crossed-sectional view of a blocking device of the projector in accordance with a third preferred embodiment of the present invention, wherein a blocking plate of the blocking device closes a second vent.
Figure 8:
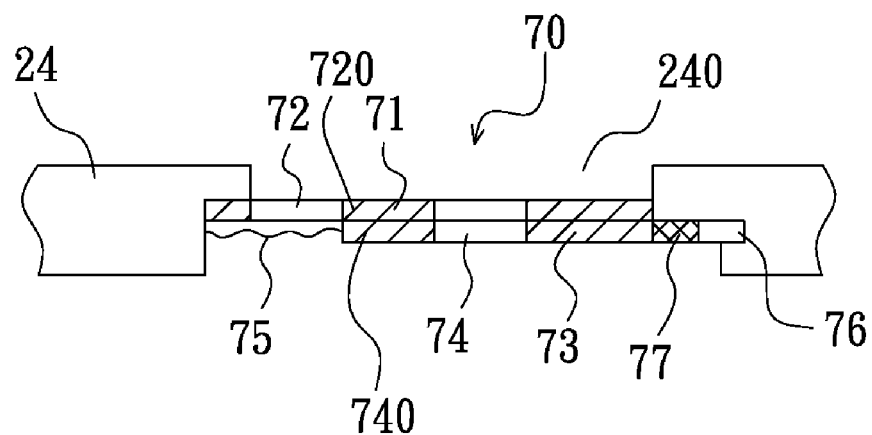
FIG. 8 is a schematic, crossed-sectional view of the blocking device in FIG. 7, wherein the blocking plate of the blocking device opens the second vent.

Referring to FIGS. 7 and 8, a blocking device 70 of the projector 20 in accordance with a third preferred embodiment is provided. The present blocking device 70 includes a first blocking plate 71, a second blocking plate 73, an elastic element 75 and an electromagnet 76. The first blocking plate 71 is fixed in the second vent 240 and has a first portion 720 and a first through hole 72. The second plate 73 is arranged adjacent to the first plate 71 and has a second portion 740 and a second through hole 74. The second blocking plate 73 further includes a metal or magnet 77 magnetized by the magnetic force. The electromagnet 76 is arranged in the second vent 240. The elastic element 75 is arranged in the second vent 240, and has a terminal end fixed on the separating plate 24 and another terminal end connected to the second blocking plate 73. When the projector is provided with power, the electromagnet 76 magnetizes the second block 73, such that the second portion 740 of the second blocking plate 73 is overlapped with the first portion 720 of the first blocking plate 71, and the second through hole 74 of the second blocking plate 73 is overlapped with the first through hole 72 of the first blocking plate 71. Therefore, the first blocking plate 71 and the second blocking plate 72 are located at the first position as shown in FIG. 8. When the power of the projector 20 is cut off, the electromagnet 76 stops magnetizing the second blocking plate 73, and the second blocking plate 73 is pulled by the elastic element 75. Therefore, the second portion 740 of the second blocking plate 73 is overlapped with the first through hole 72 of the first blocking plate 71, such that the first blocking plate 71 and the second blocking plate 73 is located at the second position as shown in FIG. 7.

Figure 9:
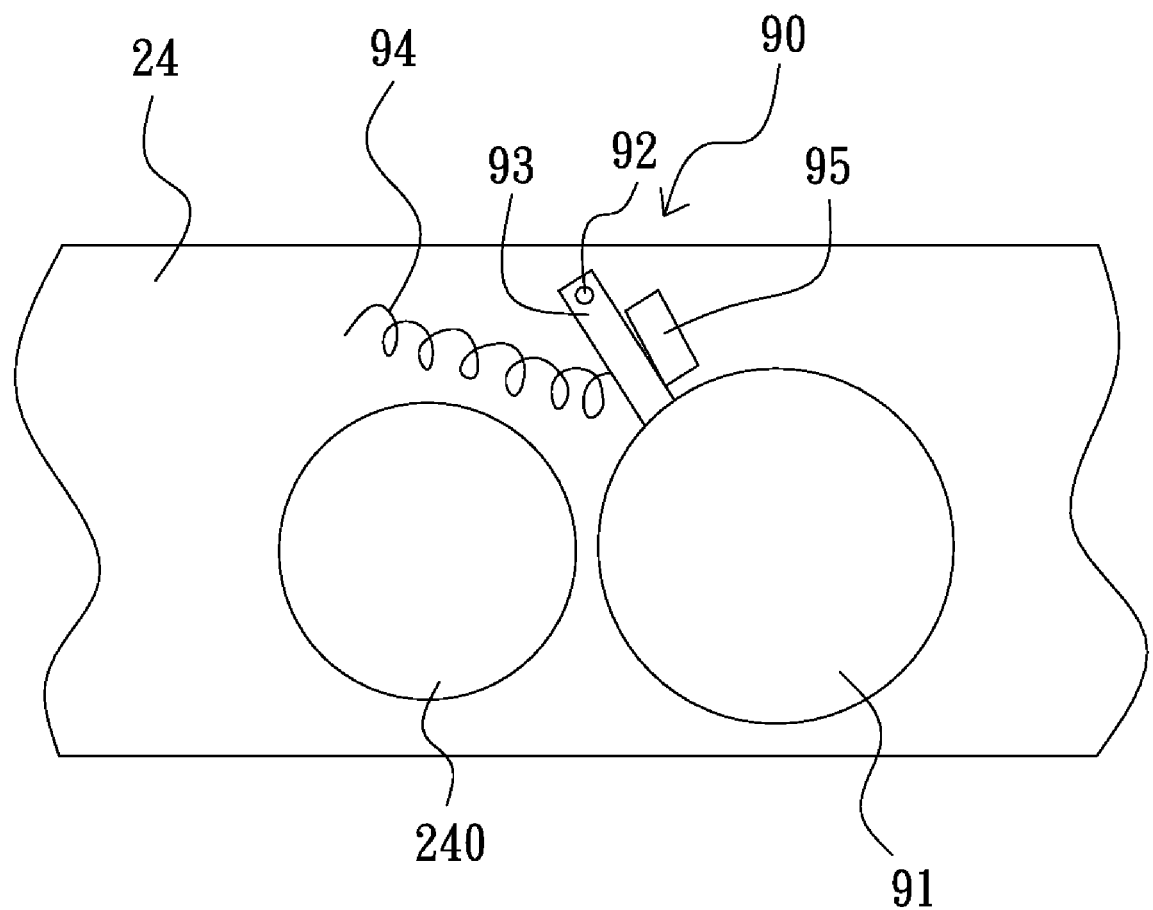
FIG. 9 is a schematic, plane view of a blocking device of the projector in accordance with a fourth preferred embodiment of the present invention, wherein a blocking plate of the blocking device opens a second vent.

Referring to FIG. 9, a blocking device 90 of the projector 20 in accordance with a fourth preferred embodiment is provided. The present blocking device 90 includes a blocking plate 91, an axis 92, a press rod 93, an elastic element 94 and an electromagnet 95. In this exemplary embodiment, the blocking plate 91 is circular, and the second vent 240 is also circular. The axis 92 is perpendicular to the plane defined by the second vent 240. The blocking plate 91 is rotatable around the axis 92. The electromagnet 95 is arranged on the separating plate 24. The elastic element 94 has a terminal end fixed on the separating plate 24, and another terminal end connected to the press rod 94. The press rod 94 is fixed on the blocking plate 91 and has a metal or magnet (not shown) magnetized by the magnetic force. Furthermore, the press rod 94 is connected rotatably to the axis 92. When the projector 20 is provided with power, the electromagnet 95 magnetizes the press rod 93 such that the blocking plate 91 is rotated to the first position to close the vent. When the projector 20 cut off the power, the electromagnet 95 stops magnetizing the press rod 93 such that the press rod 93 is pulled by the elastic element 94 and the blocking plate 91 is rotated to the second position (not shown).

Furthermore, the shape of the blocking plate and the vent of the above embodiments are not limited to a specific shape. It only needs the blocking plate closes or opens the vent at the different positions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
   a case having a space defined therein;
   a separating plate arranged in the case to divide the space into a first space and a second space;
   an electronic component system arranged in the first space;
   a light source device arranged in the second space to be configured for emitting light; and
   a blocking device having a blocking plate, the blocking plate being arranged adjacent to the separating plate and controlled by the blocking device to be located from a first position and a second position;
   wherein when the blocking plate is located at the first position, air flows from the first space into the second space, and when the blocking plate is located at the second position, air in the second space is prevented from entering into the first space.

2. The projector as claimed in claim 1, further comprising an air blast device arranged in the first space to be configured for generating airflow, the airflow being configured for dissipating heat generated from the light source device out of the projector.

3. The projector as claimed in claim 2, wherein the air blast device includes a fan.

4. The projector as claimed in claim 2, wherein the air blast device is fixed on the separating plate through a frame, and the blocking plate is arranged between the light source device and the air blast device.

5. The projector as claimed in claim 1, wherein the light source device includes a bulb.

6. The projector as claimed in claim 1, wherein the electronic component system includes one of a main board and a printed circuit board.

7. The projector as claimed in claim 1, further comprising an optical engine arranged in the first space.

8. The projector as claimed in claim 1, wherein the case further has a side surface and at least one first vent is arranged on the side surface, and the first vent is communicated with the second space.

9. The projector as claimed in claim 1, wherein the separating plate includes a transmission portion arranged between the light source device and the optical engine.

10. The projector as claimed in claim 1, wherein the separating plate includes a second vent and the blocking plate is arranged in the second vent and rotatable around an axis parallel with a plane defined by the second vent.

11. The projector as claimed in claim 10, wherein the blocking device further includes an electromagnet, an elastic element and a press rod, the electromagnet is arranged in the projector, the elastic element has a terminal end fixed in the projector and another terminal end connected to the press rod, the press rod is fixed on the axis and has one of metal and magnet magnetized by the magnetic force, when the projector is provided with power, the electromagnet magnetizes the press rod such that the blocking plate is rotated to the first position; when the power of the projector is cut off, the electromagnet stops magnetizing the rod, and the press rod is pulled by the elastic element such that the blocking plate is rotated to the second position.

12. The projector as claimed in claim 1, wherein the separating plate includes a second vent and the blocking plate is arranged in the second vent and convolutable around an axis.

13. The projector as claimed in claim 12, wherein the blocking device includes an electromagnet, an elastic element and a press rod, the electromagnet is arranged in the projector, the elastic element has a terminal end fixed in the projector and another terminal end connected to the projector, the press rod is fixed on the axis and has one of metal and magnet magnetized by the magnetic force, when the projector is provided with power, the electromagnet magnetizes the press rod to make the blocking plate wrap around the axis, such that the blocking plate is located at the first location; when the power of the projector is cut off, the electromagnet stops magnetizing the press rod and the press rod is pulled by the elastic element, such that the blocking plate is located at the second location.

14. The projector as claimed in claim 1, wherein the separating plate includes a second vent, the blocking plate includes a first blocking plate and a second blocking plate, the first blocking plate is arranged immovably in the second vent and has at least one first portion and at least one first through hole, the second blocking plate is arranged adjacent to the first blocking plate and has at least one second portion and at least one second through hole, when the blocking plate is located at the first position, the second portion of the second blocking plate is overlapped with the first portion of the first blocking plate, and the second through hole of the second blocking plate is overlapped with the first through hole of the first blocking plate; when the blocking plate is located at the second position, the second portion of the second blocking plate is overlapped with the first through hole of the first blocking plate to close the first through hole.

15. The projector as claimed in claim 14, wherein the blocking device further includes an electromagnet and an elastic element, the electromagnet is arranged in the second vent and fixed to the separating plate, the elastic element is arranged in the second vent and has a terminal end fixed to the separating plate and another terminal end connected to the second blocking plate, the second blocking plate has one of metal and magnet magnetized by the magnetic force, when the projector is provided with power, the electromagnet magnetizes the second blocking plate such that the blocking plate is located at the first position; when the power of the projector is cut off, the electromagnet stops magnetizing the second blocking plate and the second blocking plate is pulled by the elastic element, such that the blocking plate is located at the second position.

16. The projector as claimed in clam 1, wherein the separating plate includes a second vent and the blocking plate is rotatable around an axis perpendicular to a plane defined by the second vent.

17. The projector as claimed in claim 16, wherein the blocking device further includes an electromagnet, an elastic element and a press rod, the magnet is arranged on the separating plate, the elastic element has a terminal end fixed on the separating plate and another terminal end connected to the press rod, the press rod is fixed on the blocking plate and has one of metal and magnet magnetized by the magnetic force, the press rod is rotatably connected to the axis, when the projector is provided with power, the electromagnet magnetizes the press rod such that the blocking plate is rotated to the first position; when the power of the projector is cut off, the electromagnet stops magnetizing the press rod such that the blocking plate is rotated to the second position by the elastic element.

* * * * *